(12) United States Patent
Kim

(10) Patent No.: US 7,712,782 B2
(45) Date of Patent: May 11, 2010

(54) PUSH-PULL TYPE TILT LEVER ASSEMBLY FOR STEERING SYSTEM OF VEHICLE

(75) Inventor: Eungjoo Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 312 days.

(21) Appl. No.: 11/959,702

(22) Filed: Dec. 19, 2007

(65) Prior Publication Data
US 2009/0020995 A1    Jan. 22, 2009

(30) Foreign Application Priority Data
Jul. 18, 2007    (KR) .................. 10-2007-0071604

(51) Int. Cl.
    B62D 1/18    (2006.01)
    B62D 1/184   (2006.01)
(52) U.S. Cl. .................. 280/775; 74/493
(58) Field of Classification Search .......... 280/775; 74/492, 493
    See application file for complete search history.

(56) References Cited

U.S. PATENT DOCUMENTS

| | | | | |
|---|---|---|---|---|
| 6,623,036 | B2* | 9/2003 | Yamamura et al. | 280/775 |
| 7,228,754 | B2* | 6/2007 | Matsumiya | 74/493 |
| 7,424,835 | B2* | 9/2008 | Adoline et al. | 74/493 |
| 7,621,197 | B2* | 11/2009 | Manwaring et al. | 74/492 |
| 2001/0019205 | A1* | 9/2001 | Ikeda et al. | 280/775 |
| 2002/0089161 | A1* | 7/2002 | Yamamura et al. | 280/777 |
| 2004/0104566 | A1* | 6/2004 | Adoline et al. | 280/775 |
| 2007/0137382 | A1* | 6/2007 | Adoline et al. | 74/493 |
| 2007/0295145 | A1* | 12/2007 | Sekii et al. | 74/493 |
| 2008/0060467 | A1* | 3/2008 | Manwaring et al. | 74/493 |
| 2008/0229865 | A1* | 9/2008 | Manwaring et al. | 74/493 |
| 2008/0231031 | A1* | 9/2008 | Manwaring et al. | 280/775 |

FOREIGN PATENT DOCUMENTS

| | | |
|---|---|---|
| JP | 10-29545 | 2/1998 |
| JP | 2004-90908 | 3/2004 |

* cited by examiner

*Primary Examiner*—Paul N Dickson
*Assistant Examiner*—Drew Brown
(74) *Attorney, Agent, or Firm*—Morgan, Lewis & Bockius LLP

(57) ABSTRACT

The present invention provides push-pull type tilt lever assembly for a steering system of a vehicle. According to the push-pull type tilt lever assembly for a steering system of a vehicle, a tilt lever assembly is disposed at the upper portion of a side of a steering column to perform locking and unlocking in tilt and telescopic functions in the steering system and achieves tilt locking and tilt unlocking by pushing or pulling a tilt lever. Further, since tilt lever is disposed at the upper portion of a side of steering column, it does not contact with the driver's knees in a car crash, such that it is possible to reduce driver's knees injury rate and remove cause of demerit for the knees injury rate in accordance with EURO NCAP that is a European car safety performance assessment programme.

6 Claims, 5 Drawing Sheets

(A)

(B)

(A)

(B)

PUSH-PULL TYPE TILT LEVER ASSEMBLY FOR STEERING SYSTEM OF VEHICLE

CROSS-REFERENCE TO RELATED APPLICATIONS

The present application is based on, and claims priority from, Korean Application Serial Number 10-2007-0071604, filed on Jul. 18, 2007, the disclosure of which is hereby incorporated by reference herein in its entirety.

FIELD OF THE INVENTION

The present invention relates to a tilt lever for steering system of a vehicle, particularly a push-pull type tilt lever assembly for steering system of a vehicle.

BACKGROUND OF THE INVENTION

In general, generating a steering force in a vehicle, a steering system uses power to reduce the operational force, smoothly transmit the operational force and allow rapid steering.

Further, a tilt structure that allows tilting the steering wheel and a telescopic structure that allows adjusting the position of the steering in the axial direction of the steering column are mounted to the steering column in the steering system for the convenience of a driver such that the driver can adjust the position of the steering wheel in accordance with his/her body shape for more comfortable driving.

These functions for more comfortable driving are generally achieved by a tilt lever assembly disposed at the lower portion of the steering column. In detail, a distance bracket is disposed inside a tilt bracket covering the steering column and a tilt lever is fastened to a side of the tilt bracket by a tilt bolt, in which as the tilt lever actuated, a pressing force is applied to the tilt bracket or a pressing force exerted on the tilt bracket to the distance bracket is released by movement of a cam, such that tilt and telescopic operations are achieved.

A mechanism having the above configuration should meet predetermined requirements in accordance with vehicle safety regulations about driver's knees injury rate by the tilt lever disposed at a side of the steering column when the knees move to the steering column in a car crash, particularly it is required to remove cause of demerit for the knees injury rate in accordance with EURO NCAP that is one of European car safety performance assessment programme. That is, in testing knees injuries due to collision of knees and a rigid body in accordance with the car safety performance assessment programme, high injury rate is a cause of demerit, thereby decreasing the car safety performance.

However, the tilt lever that allows comfortable driving is commonly disposed at the lower portion of the steering column, such that even though the steering column is covered, a part of tilt lever is exposed and the mechanism necessarily has a structural vulnerability in that driver's knees are not safe in a car crash.

Further, the tilt lever is commonly made of steel and disposed at the lower portion of a side of the steering column, such that it causes concentrated load and becomes a cause of demerit in measuring knees injury rate in accordance with EURO NCAP.

Accordingly, an airbag, for knees is provided over the exposed part of the tilt lever, but this configuration increases cost and weight and is difficult to be practically applied to vehicles.

In addition, since the tilt lever commonly pivots about a hinge shaft, the rotational angle of the tilt lever is limited to about 40° or less by interference with a crash pad lower panel in operation (rotation) and operational quality is deteriorated by the limit on the rotational angle of the tilt lever.

Further, since the tilt lever is disposed at the lower portion of a side of the steering column, it is difficult to secure visibility in operation and operational position is bad, which also deteriorates the operational quality.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made in an effort to solve the aforementioned problems associated with prior arts, and provides a push-pull type tilt lever assembly to meet regulations about knees injuries provided by EURO NCAP, by disposing a tilt lever, which provides tilt and telescopic functions to a steering wheel, at the upper portion of a steering column to increase movement distance of driver's knees to the tilt lever and prevent the knees from reaching the tilt lever in a car crash.

Further, it is another object of the present invention to improve visibility and operational performance of the tilt lever by providing tilt and telescopic functions to the steering wheel while the tilt lever disposed at the upper portion of a side of the steering column is pulled in the axial direction of the steering column.

Further, it is another object of the present invention to prevent deterioration of operational quality of the tilt lever due to a high cam slope angle defined by limit on a rotational angle that appears in rotation type of tilt lever by increasing operational stroke in the axial direction of a steering column of the tilt lever that is disposed at the upper portion of a side of the steering column.

Embodiments of the present invention provide a push-pull type tilt lever assembly for a steering system of a vehicle. The tilt lever assembly is disposed at a side of a tilt bracket that covers a steering column and connected with a distance bracket by a tilt bolt to achieve a telescopic function that allows increasing/decreasing the length of the steering column and a tilt function that allows tilting a steering wheel. Further, a tilt lever is arranged in the axial direction of the steering column at the upper portion of a side of the tilt bracket covering the steering column and the telescopic and tilt functions are achieved by pushing or pulling the tilt lever in the axial direction of the steering column.

Further, the tilt lever assembly includes a guide bracket that is disposed at a side of the tilt bracket covering the steering column and pushes the distance bracket connected by the tilt bolt to the steering column, using an axial pressing force to generate a fixing force. The guide bracket is mechanically assembled by cam connection such that a earn rotates and axially moves to generate the fixing force between the distance bracket and the steering column. The tilt lever is axially disposed at the upper portion of the steering column and applies a normal/reverse rotating force to the cam by being pushed of pulled in the axial direction of the steering column.

Further, the tilt lever has pulling/pushing-locking means that protrude from a side of the extending rack bar of the tilt lever 13, at a predetermined distance from each other, to limit axial movement distance when being pulled or pushed in the axial direction of the steering column.

According to a push-pull type tilt lever assembly for a steering system of a vehicle of an exemplary embodiment of the present invention, a tilt lever disposed in the axial direction of a steering column allows tilt locking and tilt unlocking in tilt and telescopic operations in the steering system by moving at the upper portion of a side of the steering column. Accordingly, it is possible to improve visibility of the tile lever and operational quality and increase an operational stroke by axial movement of the tilt lever. Further, it is possible to prevent deterioration of the operational quality of the tilt lever due to a high cam slope angle defined by limit on a rotational angle that appears in rotation type of tilt lever.

Further, according to a push-pull type tilt lever assembly for a steering system of a vehicle of an exemplary embodiment of the present invention, it is possible to dispose a tilt lever at the upper portion of a side of a steering column, such that it is possible to basically prevent damage to driver's knees by the tilt lever in a ear crash and remove cause of demerit for the knees injury rate in accordance with EURO NCAP that is a European car safety performance assessment programme.

Further, according to a push-pull type tilt lever assembly for a steering system of a vehicle of an exemplary embodiment of the present invention, it is possible to obtain the same lever of car safety performance assessment even if SBR (Seatbelt Reminder) that is applied to recover cause of demerit about knees injury rate in accordance with EURO NCAP that is a European car safety performance assessment programme is not provided.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
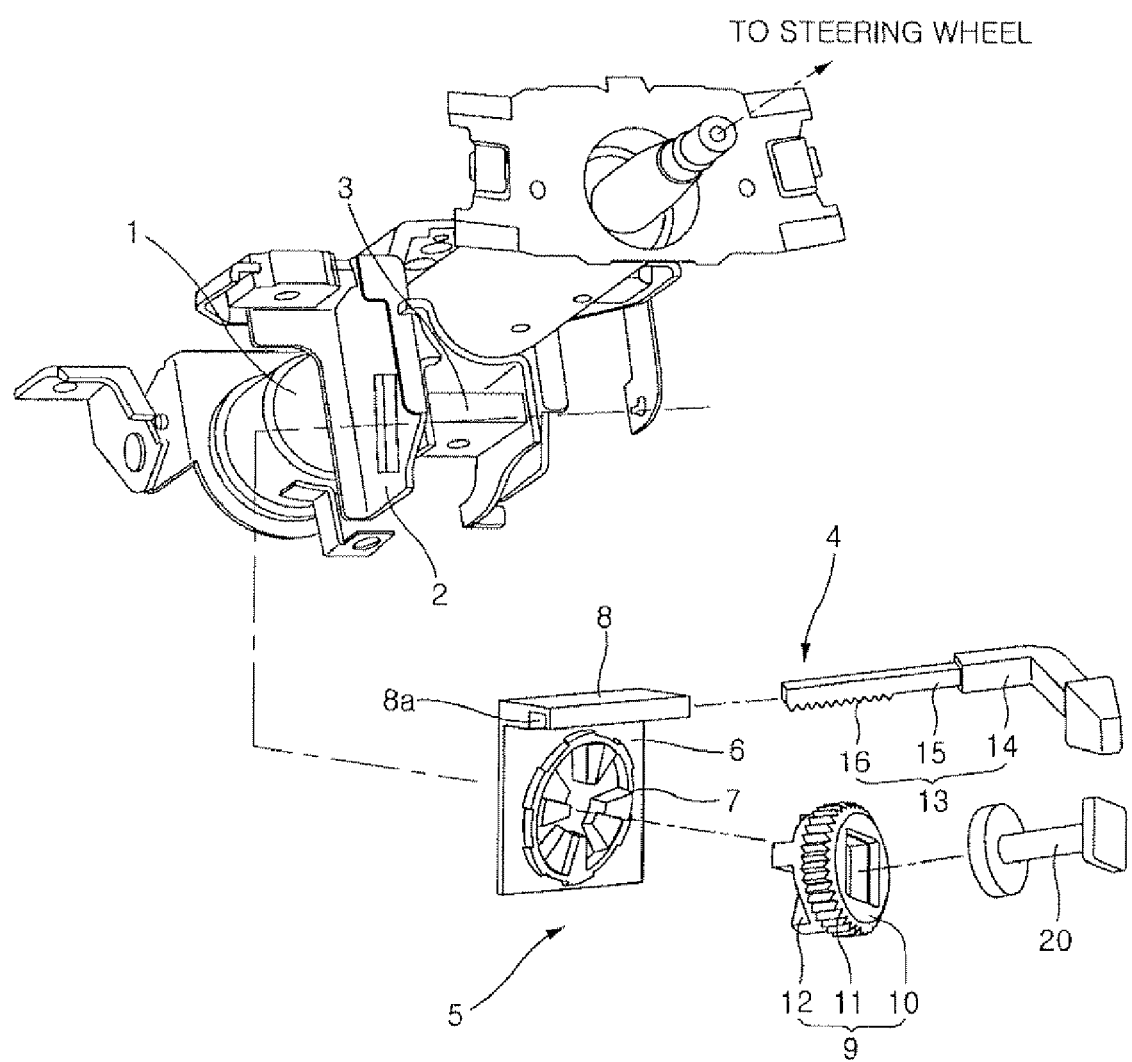
FIG. 1 is a view showing the configuration of a push-pull type tilt lever assembly for a steering system of a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention is described with the accompanying drawings.

FIG. 1 shows the configuration of a push-pull type tilt lever assembly for a steering system of a vehicle according to an exemplary embodiment of the present invention.

The steering system includes a tilt lever assembly 4 that is disposed at a lateral side of a tilt bracket 2.

The tilt bracket 2 covers a portion of a steering column 1 and is connected with a distance bracket 3 by a tilt bolt 20 to telescopically increase or decrease the length of steering column 1 and to tilt a steering wheel (not shown).

Further, tilt lever assembly 4 includes a tilt lever 13 that is arranged in the axial direction of steering column 1 at the upper portion of a lateral side of tilt bracket 2 covering steering column 1. The telescopic and tilt functions of the tilt bracket 2 are achieved by pushing or pulling the tilt lever 13 in the axial direction of steering column 1 as explained later in detail.

The tilt lever assembly 4 includes a guide bracket 5 that is disposed at an outer side of tilt bracket 2 and pushes the tilt bracket 2 against the distance bracket 3 coupled by tilt bolt 20 to steering column 1 by using an axial pressing force of the guide bracket 7 in the traverse direction of the steering column 1 to generate a fixing force.

Figure 2:
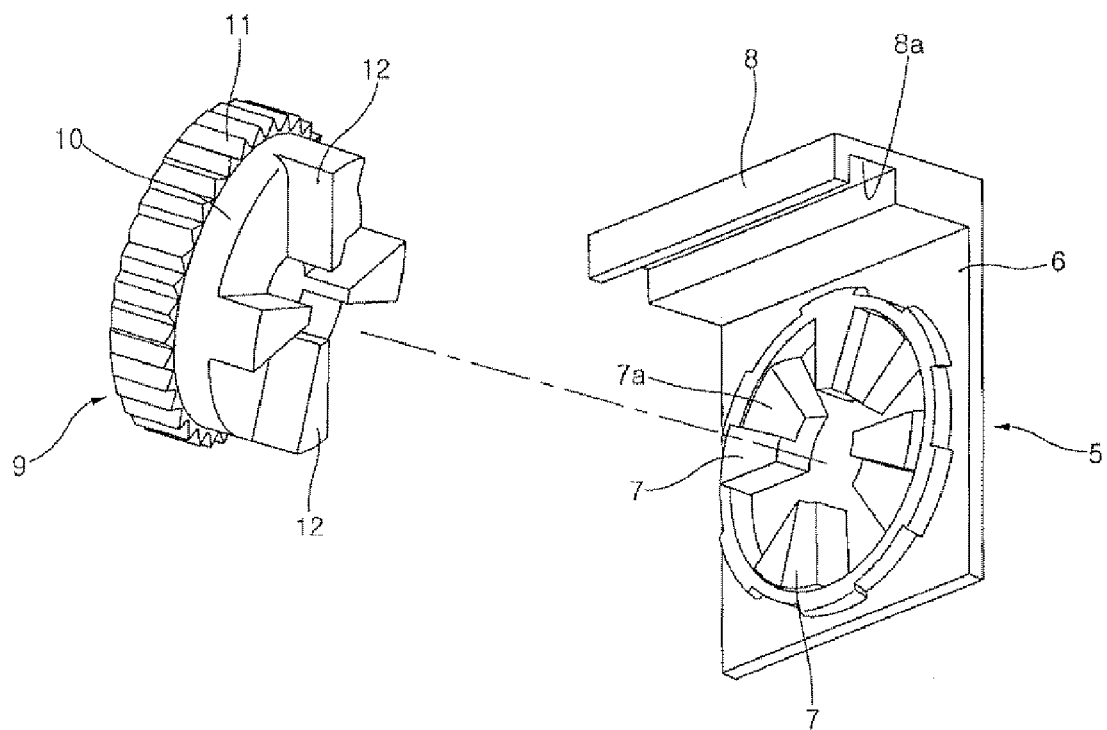
FIG. 2 is a view illustrating cam connection of a cam and a guide bracket of a push-pull type tilt lever assembly according to an exemplary embodiment of the present invention.

In detail, the guide bracket 5, as shown in FIG. 2, has a flat cam contact plate 6 that is in lateral contact with an outer side of tilt bracket 2, multi-stepped cam engaging protrusions 7 that are formed on a side of flat cam contact plate 6 and each of which has a cam guide step 7a, and a movement limit wall 8 that is curved at a right angle from the upper end portion of the flat cam contact plate 6 and has a guide channel 8a that is longitudinally formed.

In addition, in the tilt lever assembly 4, the guide bracket 5 is mechanically assembled by cam connection such that a cam 9 can rotate and axially move to generate a fixing force between the distance bracket 3 and the steering column 1.

The cam 9, as shown in FIG. 2, has a cam body 10 that is rotatably connected by the tilt bolt 20, a cam gear 11 that is formed on the outer circumference of cam body 10 and receives a rotational force from the outside, and cam positioners 12 that protrude from a side of the cam body 10.

Figure 4:
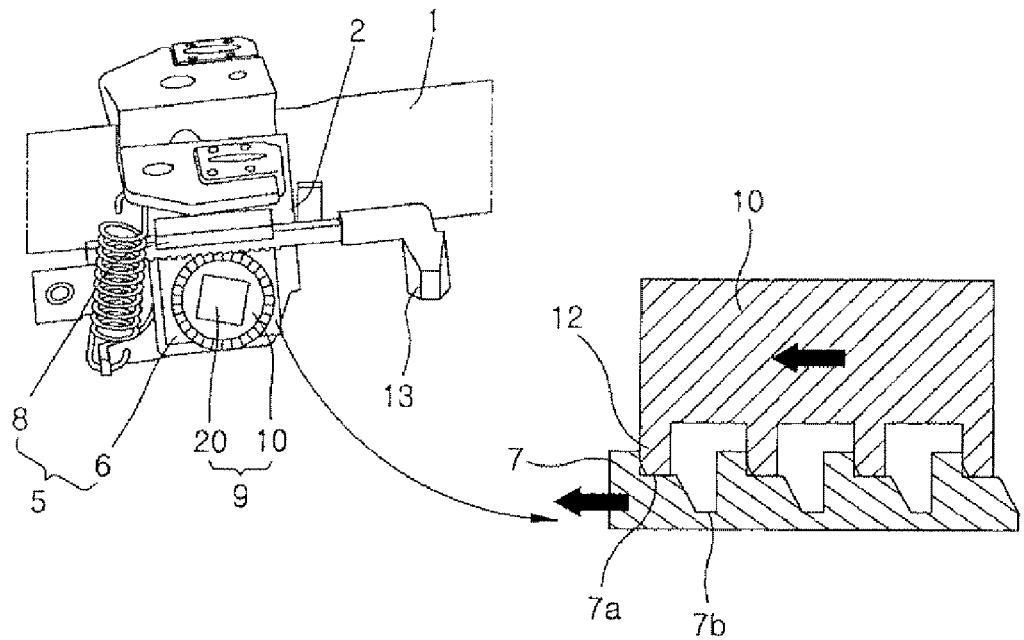
FIGS. 4A and 4B are views illustrating the operation of a push-pull type tilt lever assembly according to an exemplary embodiment of the present invention.
Figure 4:
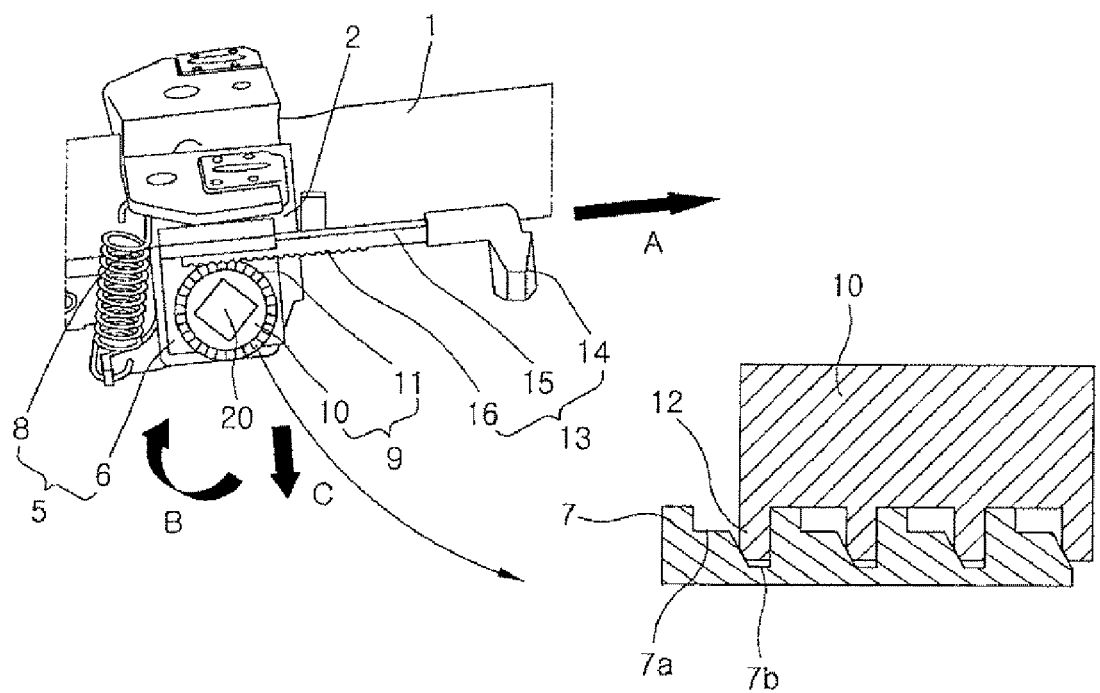

According, to the tilt lever assembly 4 having the above configuration, by engaging the multi-stepped cam engaging protrusions 7 of guide bracket 5 with the cam positioners 12 of the cam 9, that is, as cam 9 rotates, the cam positioners 12 slidably move on cam guide steps 7a of cam engaging protrusions 7, such that, as shown in FIGS. 4A and 4B, cam 9 moves in the rotational axis direction and pushes or releases the guide bracket 5. As a result, the distance bracket 3 contacts to the steering column 1 and is fixed.

In addition, tilt lever assembly 4 includes tilt lever 13 that is axially disposed at the upper portion of steering column 1 and allows tilt-locking and tilt-unlocking by being pulled or pushed in the axial direction of steering column 1.

Tilt lever 13 has a grip 14 that is held for operation, an extending rack bar 15 that extends from a distal end portion of the grip 14 bent substantially at a right angle, and a rack gear 16 that is formed at the lower portion of rack bar 15.

Figure 5:
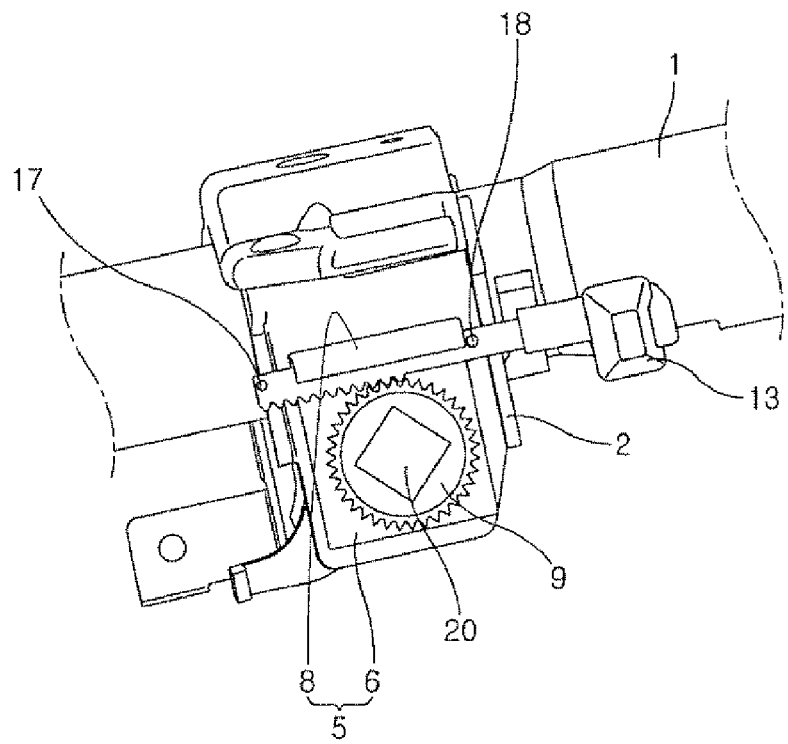
FIGS. 5A and 5B are modifications of a push-pull type tilt lever assembly for a steering system of a vehicle according to an exemplary embodiment of the present invention.
Figure 5:
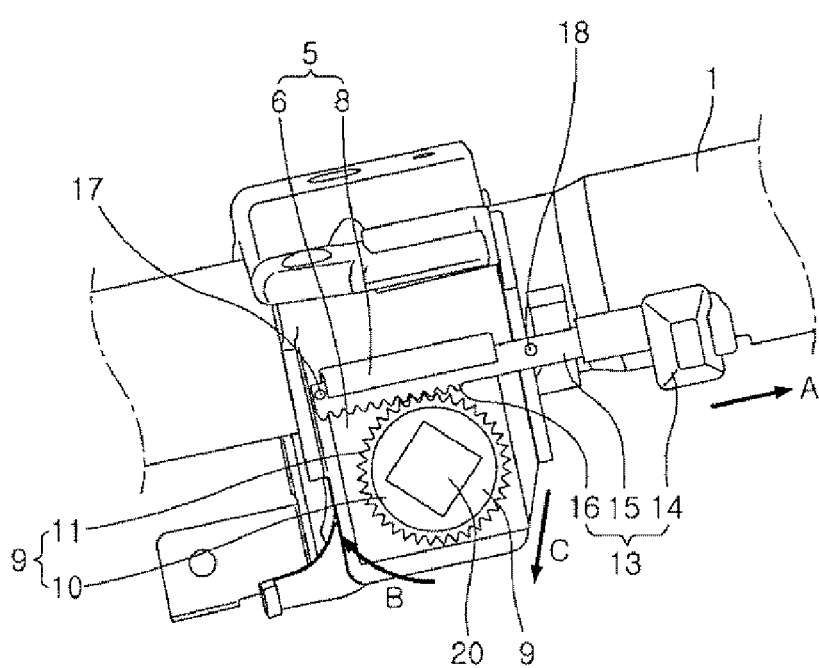

On the other hand, tilt lever 13 has various stoppers that limit axial movement distance when being pulled or pushed in the axial direction of steering column 1. For example, as shown in FIGS. 5A and 5B, pulling/pushing-locking means 17, 18 that protrude from a lateral side of extending rack bar 15 of tilt lever 13 are formed at a predetermined distance.

The distance between pulling/pushing-locking means 17, 18 is the rotational displacement of the cam gear 11 of the cam 9 between the tile-locking operation and the tilt-unlocking operation.

Further, steering column 1 is formed in an inner/outer column type that is telescopically extendable or collapsible in the axial direction and has common telescopic and tilt structures to tilt the steering wheel.

The operation of the push-pull type tilt lever assembly for steering system of a vehicle according to an embodiment of the present invention is described in detail hereafter with reference to the accompanying drawings.

According to tilt lever assembly 4 of an exemplary embodiment of the present invention, tilt lever 13 is disposed at the upper portion of a side of steering column 1. By pushing downwards in the axial direction of the steering column 1, the cam 9 moves in the traverse direction the distance bracket 3 and thus press the steering column 1.

Accordingly, when tilt lever 13 is pulled upwards in the axial direction of steering column 1, the tilt locking is achieved, but when tilt lever 13 is pushed downwards in the axial direction of steering column 1, the tilt unlocking is achieved.

Further, according to tilt lever assembly 4 of an exemplary embodiment of the present invention, since tilt lever 13 is disposed at the upper portion of a side of steering column 1, the tilt lever 13 does not contact with the driver's knees in a car crash, such that it can reduce driver's knees injury rate and remove cause of demerit for the knees injury rate in accordance with EURO NCAP that is a European car safety performance assessment programme.

As described above, a variety of characteristics of a push-pull type tilt lever assembly for steering system of a vehicle according to an exemplary embodiment of the present invention, that is, the telescopic function that allows adjusting the length of steering column 1 and/or the tilt function that allows tilting the steering wheel in the steering system are achieved by tilt lever assembly 4 that includes the cam that rotates and moves in the rotational axis direction on a side of steering column 1 and tilt lever 13 that applies torque to the cam by being pulled or pushed, and applies the tilt locking and tilt unlocking with respect to steering column 1.

Tilt lever assembly 4 is completed, as shown in FIGS. 3A to 3E, by covering steering column 1 with tilt bracket 2 inside of which distance bracket 3 is fastened onto by tilt bolt 20, connecting guide bracket 5 to a side of tilt bracket 2, and then sequentially assembling cam 9 and tilt lever 13.

Figure 3:
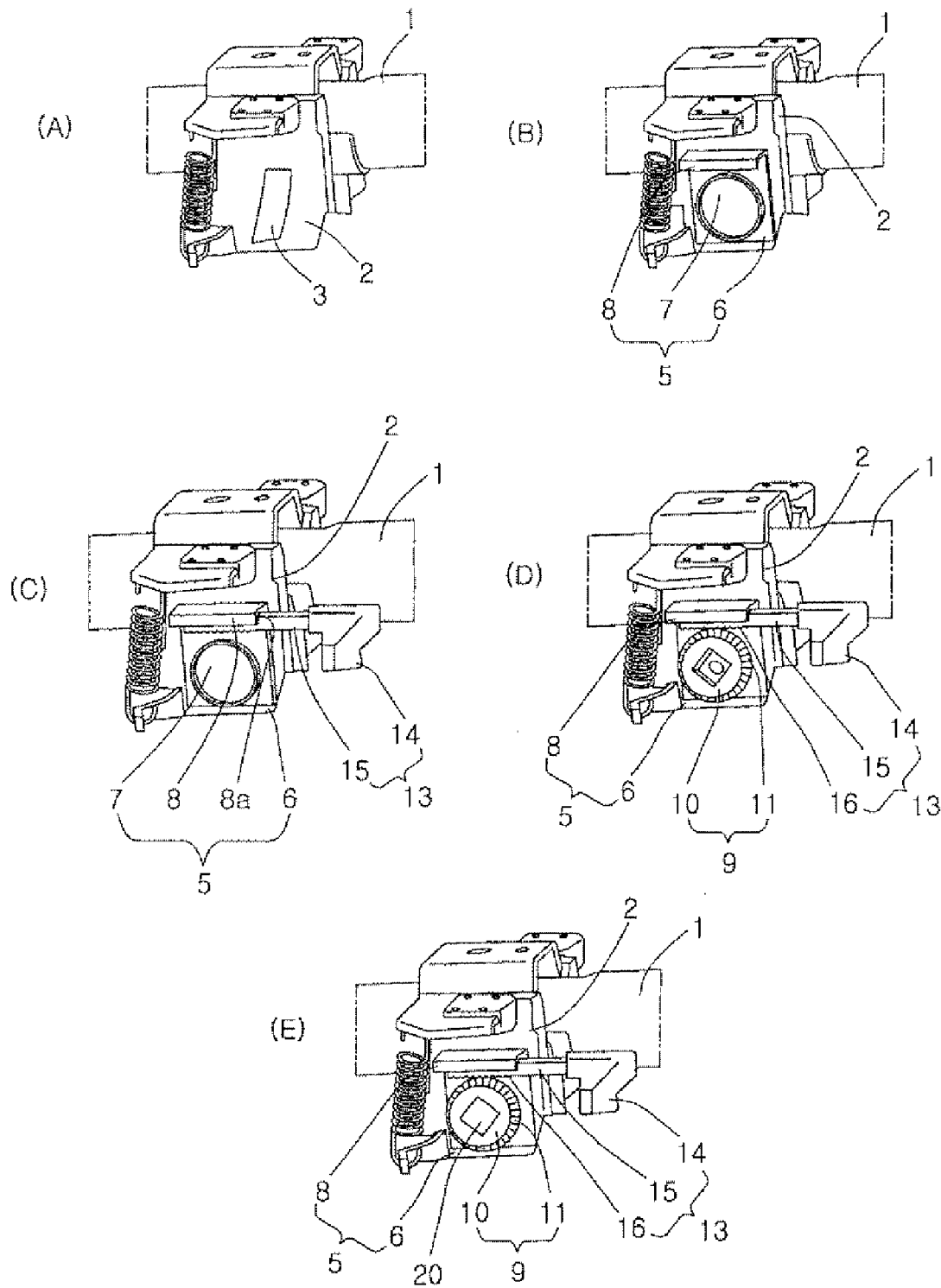
FIG. 3A to 3E are views illustrating the operation of mounting a push-pull type tilt lever assembly to a steering system of a vehicle according to an exemplary embodiment of the present invention.

That is, as shown in FIG. 3B guide bracket 5 is connected to an outer side of tilt bracket 2, and then, as shown in FIG. 3C, tilt lever 13 is inserted into guide channel 8a formed on movement limit wall 8 of guide bracket 5 such that extending rack bar 15 of tilt lever 13 is inserted into guide channel 8a.

As shown in FIG. 3D, cam 9 is then connected to guide bracket 5, in which mechanical cam connection between guide bracket 5 and cam 9 is formed by engaging cam gear 11 of cam 9 with rack gear 16 formed at a lower portion of extending rack bar 15 of tilt lever 13 while engaging the cam positioners 12 of cam body 10 with the cam engaging protrusions 7 of the guide bracket 5.

As described above, after guide bracket 5, cam 9, and tilt lever 13 are assembled to a outer side of tilt bracket 2, as shown in FIG. 3E, cam 9 is rotatably fixed by tilt bolt 20 that passes through distance bracket 3 and mounting tilt lever assembly 4 is finished.

According to tilt lever assembly 4, when tilt lever 11 is at the locking position, as shown in FIG. 4A, the tilt lever 13 is maximally pushed inside, which defines the initial position of cam 9 engaged with rack gear 16 of extending rack bar 15 of the tilt lever 13.

That is, while cam positioner 12 of cam 9 is on cam guide step 7a of cam engaging protrusion 7 of guide bracket 5, a pressing force is exerted onto the guide bracket 5 in the axial direction of tilt bolt 20 by cam positioner 12.

The axial force exerted to guide bracket 5 by cam 9 pushes distance bracket 3, such that steering column 1 is fixed by the force to be tilt-locked.

However, when tilt lever 13 is pulled (in the direction "A") as shown in FIG. 4B, rack gear 16 engaged with cam gear 11 rotates the cam 9 by tilt lever 13 pulled, such that cam positioner 12 is moved on cam guide step 7a of cam engaging protrusion 7 of guide bracket 5 by the rotation (in direction "B") of cam 9.

Further, as tilt lever 13 is further pulled, cam 9 more rotates, such that cam positioner 12 of cam 9 moves down to cam guide step 7b of cam engaging protrusion 7 of guide bracket 5.

As described above, as the cam positioner 12 of cam 9 moves down from cam guide step 7a to cam guide step 7b of cam engaging protrusion 7, that is, as the cam 9 move in the axial direction of tilt bolt 20 (direction "C"), the pressing force exerted on guide bracket 5 is released, such that distance bracket 3 that is in contact to steering column 1 is detached from steering column 1 by releasing the pressing force exerted on guide bracket 5. Consequently, the fixing force exerted on steering column 1 is released and the tilt locking is converted into the tilt unlocking.

On the other hand, it is possible to limit the axial movement distance of tilt lever 13 in converting the tilt locking/tilt unlocking by movement of tilt lever 13, that is, as shown in FIG. 5A, for tilt locking, even though tilt lever 13 is maximally pushed, pushing-locking means 18 formed substantially near a proximate portion of extending rack bar 15 of tilt lever 13 stops tilt lever 13 from being excessively pushed.

That is, when pushing-locking means 18 of tilt lever 13 is locked by movement limit wall 8 of guide bracket 5, tilt lever 13 is no more pushed even though it keeps being pushed, such that the movement distance of tilt lever 13 pushed for locking is restricted.

In contrast, as shown in FIG. 5B, tilt lever 13 is maximally pulled for tilt unlocking, such that tilt lever 13 is no more pulled or not separated by pulling-locking means 17 positioned substantially near a distal end portion of extending rack bar 15 of tilt lever 13.

That is, when pulling-locking means 17 of tilt lever 13 is locked by movement limit wall 8 of guide bracket 5, tilt lever 13 is no more pulled even if it keeps being pulled, such that the movement distance of tilt lever 13 pulled for unlocking is restricted.

On the other hand, since tilt lever 13 is disposed at the upper portion of a side of steering column 1, tilt lever assembly 4 according to an embodiment of the present invention meets EURO NCAP.

That is, since tilt lever 13 is disposed at the upper portion of a side of steering column 1, the distance from the knees to tilt lever 13 is increased as compared with when tilt lever 13 is disposed at the lower portion of a side of steering column 1; therefore, when driver's knees move to tilt lever 13 in a car crash, the driver's knees do not reach tilt lever 13 when the movement distance of the knees by a car crash is small, because the distance is increased. Further, even in a car crash between large vehicles, it is difficult for driver's knees to reach tilt lever 13.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A push-pull type tilt lever assembly for a steering system of a vehicle:

wherein the tilt lever assembly is disposed at an outer side of a tilt bracket that covers a portion of a steering column and connected with a distance bracket by a tilt bolt to achieve a telescopic function that allows increasing/decreasing the length of the steering column and a tilt function that allows tilting a steering wheel; and a tilt lever is arranged in the axial direction of the steering column at the upper portion of a side of the tilt bracket covering the steering column, and the telescopic and tilt functions are achieved by pushing or pulling the tilt lever in the axial direction of the steering column;

wherein tilt lever assembly includes:

a guide bracket that is disposed at a side of the tilt bracket covering the steering column and pushes the distance bracket connected by the tilt bolt to the steering column, using an axial pressing force to generate a fixing force, wherein the guide bracket is mechanically assembled by cam connection such that a cam rotates and axially moves to generate the fixing force between the distance bracket and the steering column; and the tilt lever is axially disposed at the upper portion of the steering column and applies a normal/reverse rotating force to the cam by being pushed or pulled in the axial direction of the steering column.

2. The push-pull type tilt lever assembly for a steering system of a vehicle as defined in claim 1, wherein the guide bracket has:

a flat cam contact plate that is in contact with a side of the tilt bracket covering the steering column;

multi-stepped cam engaging protrusions that are formed on a side of the cam contact plate and each of which has a cam guide step; and a movement limit wall that is curved at a right angle from the upper end portion of the cam contact plate and has a guide channel that is longitudinally formed.

3. The push-pull type tilt lever assembly for a steering system of a vehicle as defined in claim 1, wherein the cam has:

a cam body that is rotatably connected by the tilt bolt;

a cam gear that is formed on the outer circumference of the cam body and receives a rotational force from the outside; and cam positioners that protrude from a side of the cam body.

4. The push-pull type tilt lever assembly for a steering system of a vehicle as defined in claim 1, wherein the tilt lever has:

a grip that is held for operation;

an extending rack bar that curvedly extends from the grip at a right angle; and a rack gear that is formed at a lower portion of the rack bar.

5. The push-pull type tilt lever assembly for a steering system of a vehicle as defined in claim 1, wherein the tilt lever has stoppers that limit axial movement distance when being pulled or pushed in the axial direction of the steering column.

6. The push-pull type tilt lever assembly for a steering system of a vehicle as defined in claim 5, wherein the stopper includes pulling/pushing-locking means that protrude from a side of the extending rack bar of the tilt lever, at a predetermined distance from each other.

* * * * *